(12) United States Patent
Cremona et al.

(10) Patent No.: US 10,923,946 B1
(45) Date of Patent: Feb. 16, 2021

(54) HYBRID BACKUP POWER SUPPLY SYSTEM

(71) Applicant: Bendix Commercial Vehicle Systems LLC, Elyria, OH (US)

(72) Inventors: Michael D. Cremona, Lakewood, OH (US); Thomas J. Hayes, Lakewood, OH (US); Abhinav Dhar, Toronto (CA)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 16/667,954

(22) Filed: Oct. 30, 2019

(51) Int. Cl.
| | |
|---|---|
| *B60T 8/17* | (2006.01) |
| *B60T 17/22* | (2006.01) |
| *B60W 10/26* | (2006.01) |
| *H02J 7/34* | (2006.01) |
| *H02J 9/06* | (2006.01) |
| *H02J 7/00* | (2006.01) |
| *B60R 16/033* | (2006.01) |

(52) U.S. Cl.
CPC ............ *H02J 9/061* (2013.01); *B60R 16/033* (2013.01); *B60T 17/22* (2013.01); *B60W 10/26* (2013.01); *H02J 7/0021* (2013.01); *B60T 8/17* (2013.01); *B60Y 2400/114* (2013.01); *H02J 7/345* (2013.01)

(58) Field of Classification Search
CPC ........ B60L 3/0092; B60R 16/033; B60T 8/17; B60T 17/18; B60T 17/22; B60T 17/221; B60W 10/26; B60W 20/13; B60Y 2400/114; H02J 7/0021; H02J 7/0047; H02J 7/0048; H02J 7/1423; H02J 7/1461; H02J 7/34; H02J 7/345; H02J 9/00; H02J 9/04; H02J 9/06; H02J 9/061; H02J 9/068; H02J 2207/50
See application file for complete search history.

(56) References Cited

U.S. PATENT DOCUMENTS

| | | | |
|---|---|---|---|
| 7,420,339 B2 | 9/2008 | Chung et al. | |
| 7,498,689 B2 | 3/2009 | Mitani et al. | |
| 2005/0284676 A1* | 12/2005 | King | B60W 10/08 180/65.22 |
| 2008/0087479 A1* | 4/2008 | Kang | H01M 8/04567 180/65.31 |
| 2008/0140275 A1* | 6/2008 | Chung | B60L 58/33 701/22 |

(Continued)

*Primary Examiner* — Levi Gannon
(74) *Attorney, Agent, or Firm* — Reising Ethington P.C.

(57) ABSTRACT

A backup power supply system and a method for providing power to an electrical load are provided. The system includes at least one supercapacitor, a battery and a power supply controller. The controller is configured to determine whether an output of a primary power supply for the load meets a first predetermined condition, determine, when the output of the primary power supply does not meet the first predetermined condition, a level of current required by the load, provide current to the load from the supercapacitor if the level of current required by the load meets a second predetermined condition, and, provide current to the load from the battery if the level of current required by the load does not meet the second predetermined condition until an output of the battery meets a third predetermined condition and thereafter provide current to the load from the supercapacitor.

20 Claims, 4 Drawing Sheets

(56) References Cited

U.S. PATENT DOCUMENTS

| | | | |
|---|---|---|---|
| 2009/0112384 A1* | 4/2009 | Jeon | H01M 16/003 701/22 |
| 2010/0090626 A1* | 4/2010 | King | B60L 50/15 318/376 |
| 2012/0168242 A1* | 7/2012 | Kulatunga | B60L 50/66 180/210 |
| 2015/0314869 A1* | 11/2015 | Lemus Martin | G05D 1/0005 701/3 |

* cited by examiner

HYBRID BACKUP POWER SUPPLY SYSTEM

BACKGROUND OF THE INVENTION a. Field of the Invention

This invention relates to a backup power supply system for an electrical load. In particular, the invention relates to a backup power supply system and a method for providing power to an electrical load in which a supercapacitor and battery are controlled to provide power to the load in a manner that that supplies sufficient power for inrush currents, insures a sufficient life span of the power supply system, and limits system size and cost.

b. Background Art

Electrical systems in many applications are required to have backup power supplies. For example, certain vehicle systems such as braking and steering systems are critical to the safe operation of the vehicle. Electronic control units (ECUs) and other components for such safety-critical systems are expected to meet certain standards for functional safety such as those set forth in International Organization for Standards (ISO) Standard 26262 ("Road Vehicles—Functional Safety"). In order to meet these standards, the ECUs in such systems are required to have a primary power supply system and a backup power supply system in case of a failure in the primary power supply system. Conventional backup power supply systems, however, are inadequate to meet the operating requirements of many vehicle ECUs. For example, lithium ion batteries are unable to discharge power at certain temperature extremes in which vehicles may operate and must be continuously recharged. Solid state batteries can only be used a single time and are unable to provide sufficient power for the relatively high inrush currents in certain ECUs without employing a large number of the batteries. Capacitors require a relatively long time to charge and are then quickly discharged when in use.

The inventors herein have recognized a need for a backup power supply system for an electrical load and a method for providing power to an electrical load that will minimize and/or eliminate one or more of the above-identified deficiencies.

BRIEF SUMMARY OF THE INVENTION

This invention relates to a backup power supply system for an electrical load. In particular, the invention relates to a backup power supply system and a method for providing power to an electrical load in which a supercapacitor and battery are controlled to provide power to the load in a manner that that supplies sufficient power for inrush currents, insures a sufficient life span of the power supply system, and limits system size and cost.

A backup power supply system for an electrical load in accordance with one embodiment includes at least one supercapacitor, a battery, and a power supply controller. The power supply controller is configured to determine whether an output of a primary power supply for the electrical load meets a first predetermined condition. The controller is further configured to determine, when the output of the primary power supply does not meet the first predetermined condition, a level of current required by the electrical load. The controller is further configured to provide current to the electrical load from the at least one supercapacitor if the level of current required by the electrical load meets a second predetermined condition. The controller is further configured to provide current to the electrical load from the battery if the level of current required by the electrical load does not meet the second predetermined condition until an output of the battery meets a third predetermined condition and thereafter provide current to the electrical load from the at least one supercapacitor.

A method for providing power to an electrical load in accordance with one embodiment includes the step of determining whether an output of a primary power supply for the electrical load meets a first predetermined condition. The method further includes the step of determining, when the output of the primary power supply does not meet the first predetermined condition, a level of current required by the electrical load. The method further includes the step of providing current to the electrical load from at least one supercapacitor of a backup power supply system if the level of current required by the electrical load meets a second predetermined condition. The method further includes the step of providing current to the electrical load from a battery of the backup power supply system if the level of current required by the electrical load does not meet the second predetermined condition until an output of the battery meets a third predetermined condition and thereafter providing current to the electrical load from the at least one supercapacitor.

In one potential application of the above-recited system and method, one embodiment of a system for controlling a wheel brake in a vehicle includes a solenoid valve configured to control a position of a brake actuator of the wheel brake, a brake controller configured to generate control signals for the solenoid valve, and a backup power supply system for the brake controller. The backup power supply system includes at least one supercapacitor, a battery, and a power supply controller. The power supply controller is configured to determine whether an output of a primary power supply for the brake controller meets a first predetermined condition. The power supply controller is further configured to determine, when the output of the primary power supply does not meet the first predetermined condition, a level of current required by the brake controller. The power supply controller is further configured to provide current to the brake controller from the at least one supercapacitor if the level of current required by the brake controller meets a second predetermined condition. The power supply controller is further configured to provide current to the brake controller from the battery if the level of current required by the brake controller does not meet the second predetermined condition until an output of the battery meets a third predetermined condition and thereafter provide current to the brake controller from the at least one supercapacitor.

A backup power supply system for an electrical load a method for providing power to an electrical load in accordance with present teachings represents an improvement as compared to conventional backup power supply systems and methods for providing power. In particular, the system and method control delivery of power from a supercapacitor and a battery to leverage advantageous properties, and minimize disadvantageous properties, of each type of power supply. In this manner, the system and method are able to supply sufficient power for inrush currents for various electrical loads, insure a sufficient life span of the power supply system, and limit system size and cost.

The foregoing and other aspects, features, details, utilities, and advantages of the present invention will be apparent

DETAILED DESCRIPTION OF THE INVENTION

Figure 1:
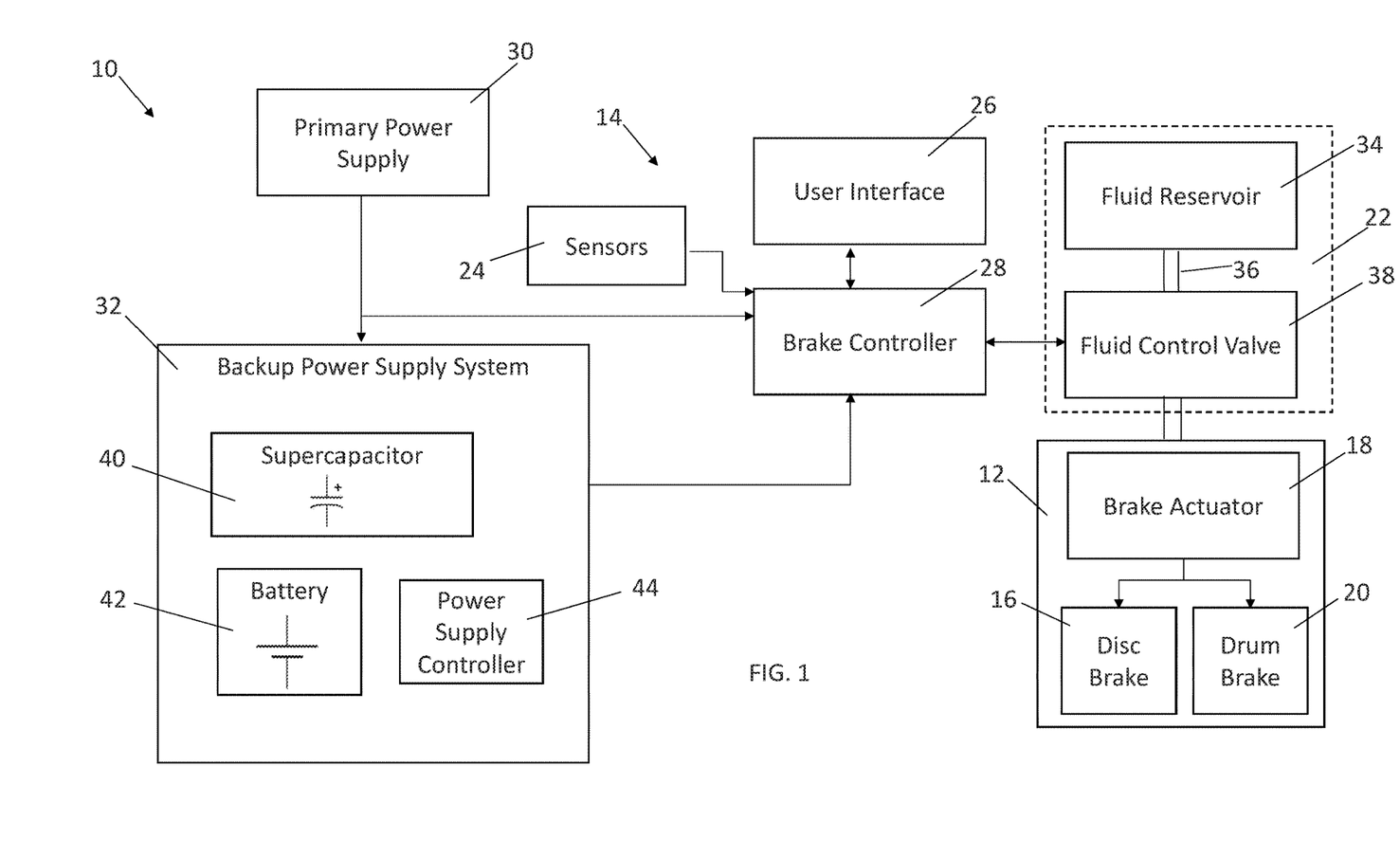
FIG. 1 is a diagrammatic view of a vehicle incorporating one embodiment of a backup power supply system for an electrical load (a vehicle brake controller) in accordance with the present teachings.

Referring now to the drawings wherein like reference numerals are used to identify identical components in the various views, FIG. 1 illustrates several components of a braking system 10 for a vehicle. In certain embodiments, the vehicle may comprise a heavy commercial vehicle and, in particular, a tractor-trailer (also referred to as a semi) containing a tractor or power unit and one or more trailers or towed units. It should be understood, however, that the inventions disclosed herein may find application in other types of commercial and non-commercial vehicles. It should also be understood that the inventions described herein may find application in a wide variety of vehicle systems other than braking system 10 including, but not limited to, powertrain systems, steering systems, fuel delivery systems, climate-control systems, etc. Finally, it should be understood that the particular application of the inventions disclosed herein (i.e. in a vehicle braking system) in exemplary only and that the inventions disclosed herein may find use in non-vehicular applications and in any application in which power is provided to an electrical load.

System 10 is configured to brake wheels on a vehicle in order to slow or stop movement of the vehicle. Braking system 10 may include a wheel brake 12 and a system 14 for controlling wheel brake 12.

Wheel brake 12 is configured to apply a braking force to one or more vehicle wheels. Brake 12 may comprise a disc brake 16 in which a carrier supports brake pads on opposite sides of a rotor rotating with the vehicle wheel and a brake actuator 18 that causes, responsive to fluid pressure or another force provided by system 14, movement of a caliper relative to the carrier to move the brake pads into and out of engagement with the rotor. Alternatively, wheel brake 12 may comprise a drum brake 20 in which brake actuator 18 causes, responsive to fluid pressure or another force provided by system 14, movement of one or more brake shoes into engagement with a braking surface in a brake drum rotating with the wheel.

System 14 is provided to control the operation of wheel brake 12. System 14 may include a fluid circuit 22 that supplies fluid pressure to wheel brake 12, sensors 24 that identify various conditions associated with the vehicle, a user interface 26, and a brake controller 28. In accordance with the present teachings, system 14 may further include a primary power supply 30 and a backup power supply system 32 for brake controller 28 and/or other electrical loads within braking system 10.

Fluid circuit 22 generates fluid pressure within braking system 10 and controls the delivery of fluid pressure to the actuator 18 of each wheel brake 12. Circuit 22 may include components for generating and storing pressurized fluid including fluid reservoirs 34, compressors and air dryers, and components or routing and delivering fluid pressure to wheel brakes 12 including fluid conduits 36 and a various valves 38 including, for example, a foot pedal valve, relay valves, modulator valves, quick release valves, and other valves. Exemplary fluid circuits are disclosed in commonly assigned U.S. patent application Ser. Nos. 15/943,907 and 16/157,214, the entire disclosures of which are incorporated herein by reference. In accordance with one embodiment, valve 38 includes one or more solenoid valve operating in response to control signals generated by brake controller 28 to cause movement of brake actuator 18 and release a parking or emergency brake in wheel brake 12. Valves 38 may include sensors that generate signals indicative of the positions of the valves 38 and other data and provide those signals to brake controller 28.

Sensors 24 are provided to identify various conditions associated with the vehicle and the surrounding environment that impact the operation of braking system 10. Sensors 24 may include wheel speed sensors that generate signals indicative of the rotational speed of a corresponding wheel and from which brake controller 28 can determine the speed of the vehicle and whether certain wheels are slipping and implement anti-lock braking through control of valves 38 in fluid circuit 22. Sensors 24 may also include pressure sensors that generate signals indicative of the fluid pressure within various fluid conduits in fluid circuit 22. Sensors 24 may also include sensors used to identify other conditions that may impact the operation of braking system 10 including, for example, an engine or transmission speed sensor that generates a signal indicative of the speed of the vehicle, a steer angle sensor that generates a signal indicative of a steering angle imparted by a vehicle operator to a steering wheel in the vehicle, a yaw rate sensor that generates a signal indicative of the angular velocity of the vehicle about its vertical (yaw) axis and longitudinal and lateral acceleration, load sensors that generate signals indicative of the forces at various locations on the vehicle, position sensors that monitor the state of the vehicle ignition, brake pedal or other vehicle components and systems, and interlock sensors (in, for example, the cabin door, driver seat and/or seat belt), used to determine the absence of the vehicle operator for purposes of automatically setting the parking brake when the operator forgets to do so.

User interface 26 provides an interface between the vehicle operator and system 14 through which the operator can control certain vehicle braking functions and receive information about vehicle braking. Interface 26 may include various input devices through which the operator can instruct system 14 to perform various braking functions including controlling the fluid pressure provided to brake actuators 18 to release and apply spring brakes acting as parking brakes for the vehicle. Interface 26 may also include various output devices through which the operator is informed of the status of system 14. These output devices may include light emitters, such as light emitting diodes, or sound emitters, such as a speaker, to convey visual and/or audio warnings, status or other information. In the case of visual output devices, information can be conveyed through differences in color, differences in intensity, differences in the number of lights, and differences in the pattern of activation of the lights. In the case of audio output devices, similar information can be conveyed through differences in the type of sound generated, differences in volume and differences in the pattern of sounds. In certain embodiments, user interface 16 may be mounted in the vehicle cabin including on the vehicle dashboard. Some exemplary interfaces are shown in commonly assigned U.S. Pub. No. 2018/0086322 A1 the entire disclosure of which is incorporated herein by reference.

Brake controller 28 is provided to control the operation of fluid control valves 38 in fluid circuit 22 and, as a result, the operation of brake actuator 18 in wheel brake 12. Controller 28 may comprise a programmable microprocessor or microcontroller or may comprise an application specific integrated circuit (ASIC). Controller 28 may include a memory and a central processing unit (CPU). Controller 28 may also include an input/output (I/O) interface including a plurality of input/output pins or terminals through which the controller 28 may receive a plurality of input signals and transmit a plurality of output signals. The input signals may include signals received from sensors 24 and user interface 26. The output signals may include signals transmitted to fluid control vales 38 of fluid circuit 22 and to user interface 26. Controller 28 may be configured to communicate with fluid circuit 22, sensors 24 and user interface 26 over a conventional vehicle communication bus such as a controller area network (CAN) (or another communication medium such as power line communication (PLC), Local Interconnect Network (LIN) or others). In alternative embodiments, controller 28 may be configured to communicate wirelessly with one or more of fluid circuit 22, sensors 24 and user interface 26 using various industry standard short-range wireless communication protocols such as Bluetooth, Wi-Fi (IEEE 802.11), or Zigbee. In certain embodiments, controller 28 may be integrated with user interface 26 in a dashboard electronic control unit (DECU).

Primary power supply 30 provides power to various electrical loads within braking system 10 including brake controller 28 and solenoid valves in valves 38. Power supply 30 may also provide power to backup power supply 32 in some circumstances. Power supply 30 may comprise a battery and an associated power regulating circuit, but it should be understood that power supply 30 may take on a variety of forms.

Backup power supply system 32 provides power to electrical loads within braking system 10 such as brake controller 28 and solenoid valves in valves 38 when primary power supply 30 is unable to provide sufficient power. System 32 provides a redundant or backup power supply for safety-critical applications such as vehicle braking as required to meet certain standards for functional safety such as those set forth in International Organization for Standards (ISO) Standard 26262 ("Road Vehicles—Functional Safety"). System 32 includes one or more supercapacitors 40, a battery 42 and a power supply controller 44.

Supercapacitors 40 (also known as an ultracapacitor) are configured to provide power in situations where an electrical load requires a relatively large amount of power in a relatively short period of time. Supercapacitors 40 are particularly provided to address inrush current requirements for brake controller 28 and to power solenoids in fluid valves 38. Supercapacitors 40 may comprise electrostatic double-layer capacitors or electrochemical pseudocapacitors or a combination in various embodiments.

Battery 42 is configured to provide power in situations where an electrical load requires a relatively small amount of power and/or power over a relatively long period of time. Battery 42 may comprise a non-rechargeable lithium ion battery in some embodiments where power supply system 32 is intended for use in limited circumstances (e.g., emergencies) to limit the size and cost of system 32.

Power supply controller 44 is provided to control the delivery of power from primary power supply 30 and backup power supply system 32 to brake controller 28 and/or other electrical loads as well as the delivery of power from primary power supply 30 to backup power supply system 32. Controller 44 may comprise a programmable microprocessor or microcontroller or may comprise an application specific integrated circuit (ASIC). Controller 44 may include a memory and a central processing unit (CPU). Controller 44 may also include an input/output (I/O) interface including a plurality of input/output pins or terminals through which the controller 44 may receive a plurality of input signals and transmit a plurality of output signals. The input signals may include signals received from sensors monitoring state of charge and other operating conditions for primary power supply 30, supercapacitor 40 and battery 42 and current requirements for brake controller 28 and other electrical loads. The output signals may include control signals for controlling power delivery from primary power supply 30, supercapacitor 40 and battery 42 and data signals used to convey warnings or other information to a vehicle occupant, including through interface 26, or other vehicle systems. Controller 44 may again be configured to communicate with sensors, primary power supply 30, supercapacitor 40, battery 42 and interface 26 over a conventional vehicle communication bus such as a controller area network (CAN) (or another communication medium such as power line communication (PLC), Local Interconnect Network (LIN) or others)).

Figure 2A:
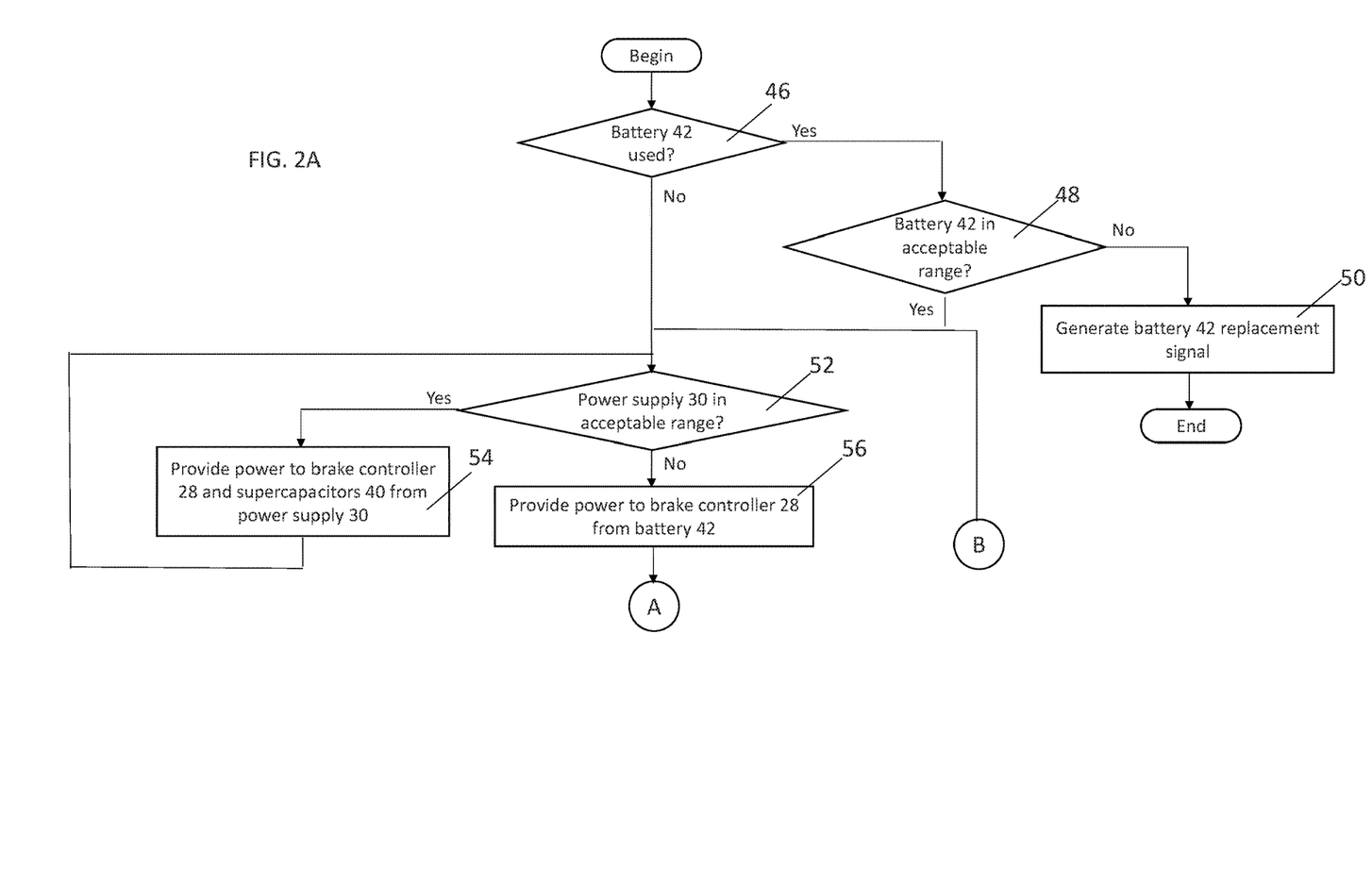
FIGS. 2A-2C are flowcharts illustrating a method for providing power to an electrical load in accordance with one embodiment of the present teachings.
Figure 2B:
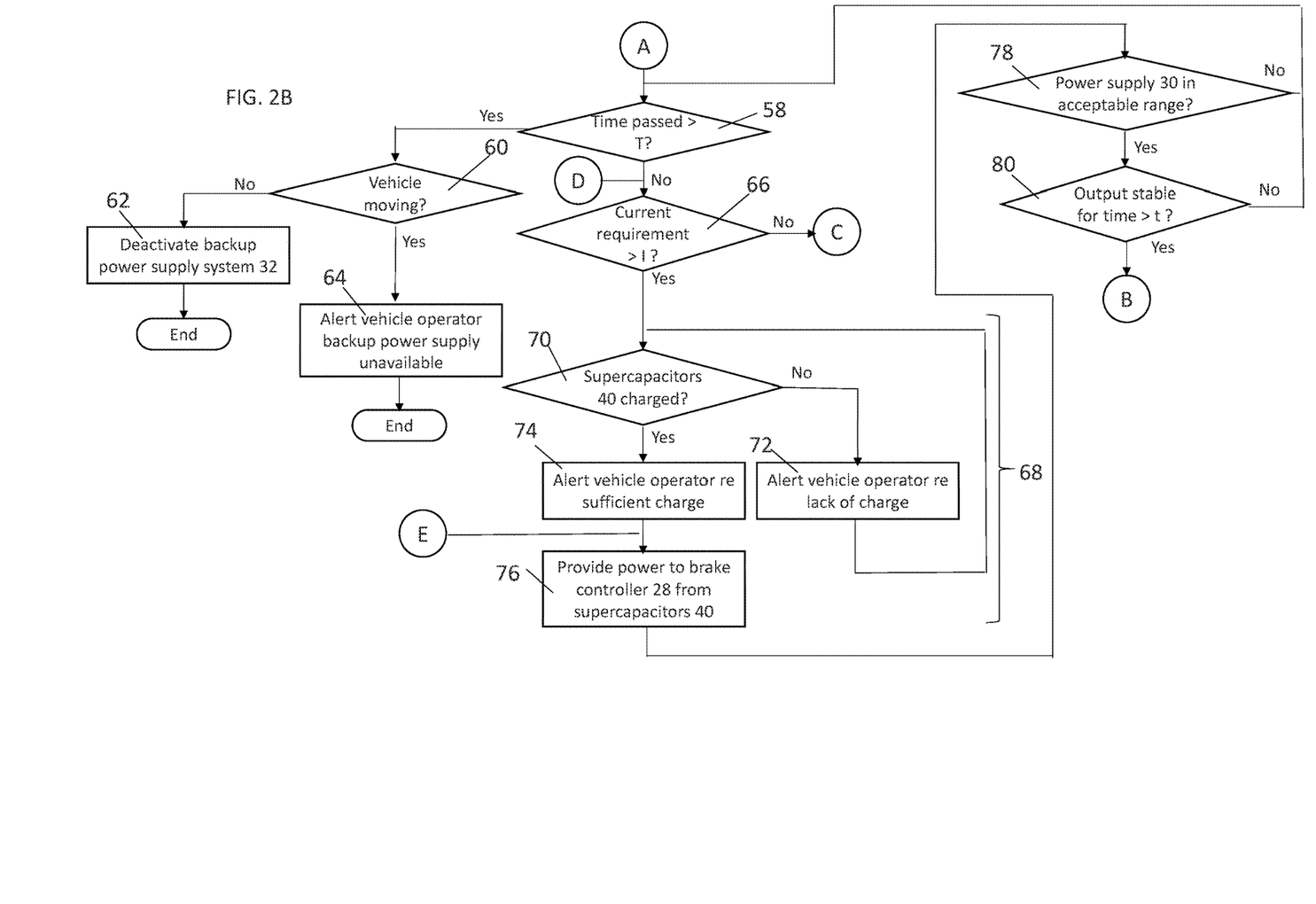
Figure 2C:
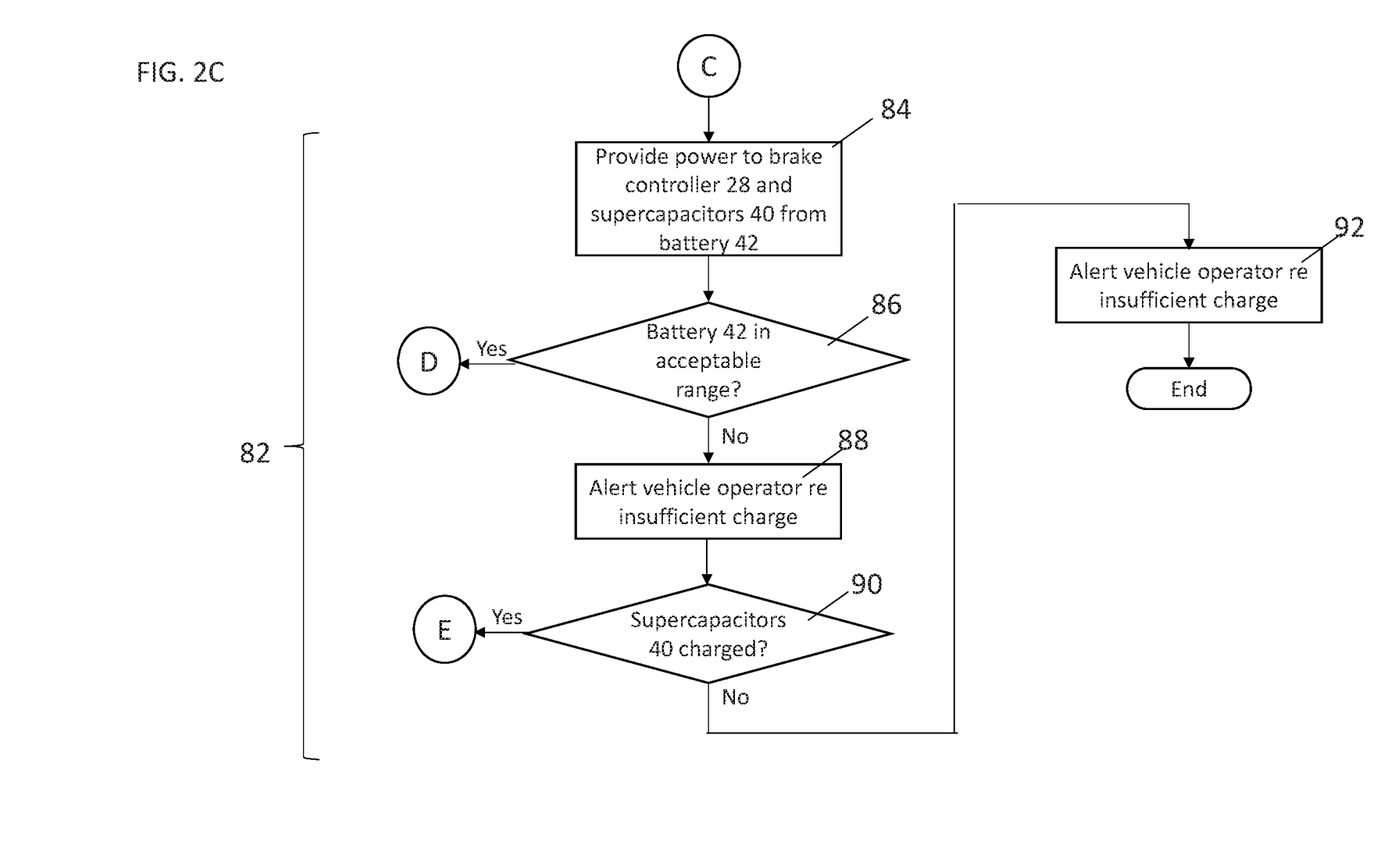

Referring now to FIGS. 2A-C, controller 44 may be configured with appropriate programming instructions (i.e., software or a computer program) to implement a method for providing power to an electrical load. Although FIGS. 2A-C illustrate an embodiment in which the electrical load comprises a brake controller 28 for a vehicle braking system 10, it should be understood that the steps of the method (aside from those communicating information to a vehicle operator specific to a vehicle application) could be implemented in connection with providing power to various types of electrical loads. Referring to FIG. 2A, the method may begin with the step 46 of determining whether battery 42 in backup power supply system 32 has been used previously. As discussed above, battery 42 may comprise a replaceable, non-rechargeable battery in certain embodiments where power supply system 32 is intended for use in limited circumstances (e.g., emergencies) to limit the size and cost of system 32. Controller 44 can determine whether battery 42 has been used before by comparing current voltage or state of charge measurements for battery 42 generated by appropriate sensors against stored values for the initial voltage or state of charge of battery 42. Alternatively, controller 44 may determine whether battery 42 has been used before by checking a flag or similar indicator in memory indicating prior use of battery 42.

If battery 42 has been used before, the method may proceed to the step 48 of determining whether the output of battery 42 meets a predetermined condition (e.g., is within a predetermined acceptable operating range). Controller 44 may make this determination responsive to sensors configured to generate signals indicative of various characteristics (voltage level, state of charge, etc.) of battery 42. If the output of battery 42 fails to meet the predetermined condition (e.g., is outside of the acceptable operating range), the method may end with the step 50 of generating a warning signal and, in particular, a signal that battery 42 needs replacement. In the illustrated embodiment, controller 44 may transmit the warning signal to interface 26 (directly or indirectly through brake controller 28) so that interface 26 generates an alert to the vehicle operator.

In situations in which battery 42 has not been previously used (step 46) or in which the battery has been previously used, but meets the predetermined condition (e.g., is within the acceptable operating range) (step 48), the method may proceed to the step 52 of determining whether an output of a primary power supply 30 meets a predetermined condition (e.g., is within a predetermined acceptable operating range). Controller 44 may again make this determination responsive to sensors configured to generate signals indicative of various characteristics (voltage level, state of charge, etc.) of primary power supply 30. If the output of primary power supply 30 meets the predetermined condition (e.g., is within the acceptable operating range), the method may continue with the step 54 of providing power to brake controller 28 from the primary power supply 30. At the same time, controller 44 may provide power to supercapacitors 40 of backup power supply system 32 from primary power supply 30 in order to charge supercapacitors 40. Steps 52, 54 may be repeated until it is determined that the output of primary power supply 30 does not meet the predetermined condition (e.g., is outside of the acceptable operating range).

If the output of primary power supply 30 does not meet the predetermined condition (e.g., is outside of the acceptable operating range) in step 52, the method may continue with the step 56 of activating battery 42 and charging supercapacitors 40 using battery 42. Thereafter, and referring to FIG. 2B, the method may proceed to step 58 in which controller 44 determines whether a predetermined period of time has passed since battery 42 was activated in step 56. The period of time may be selected based on the desired maximum operating time for backup power supply system 32 (e.g., five (5) minutes). If the predetermined period of time has passed, the method may continue with the step 60 of determining whether the vehicle has stopped moving. Controller 44 can make this determination responsive to the output of a variety of sensors 24 indicative of movement of the vehicle including, for example, wheel speed sensors. If the vehicle is not moving, the method may end with the step 62 of deactivating backup power supply system 32 on the assumption that the vehicle has stopped and braking is no longer required. If the vehicle is moving, the method may end with the step 64 in which controller 44 generates a warning signal indicative of the fact that the predetermined period of time has passed and that the backup power supply system 32 is no longer available to assist with braking the vehicle in order to allow the vehicle operator to take evasive actions if braking is required (e.g., by slowly releasing fluid pressure from the brake actuator 18 or "bleeding" the brake 12). Controller 44 may again transmit the warning signal to interface 26 (directly or indirectly through brake controller 28) so that interface 26 generates an alert to the vehicle operator.

Referring again to step 58, if the predetermined period of time has not passed, the method may continue with a series of steps intended to provide power to brake controller 28 from backup power supply system 32. In step 66, controller 44 determines a level of current required by brake controller 28 (or another electrical load) and determines whether the level of current required meets a predetermined condition (e.g., is greater than a predetermined current level). If the level of current meets the predetermined condition (e.g., is greater than a predetermined current level), controller 44 may initiate a series of steps intended to provide power to brake controller 28 from supercapacitors 40. If the level of current does not meet the predetermined condition (e.g., is less than a predetermined current level), controller 44 may initiate a series of steps intended to initially provide power to brake controller 28 from battery 42 and subsequently, if the battery 42 is drained beyond an acceptable level, provide power from supercapacitors 40.

If the level of current required by brake controller 28 meets the predetermined condition (e.g., is greater than a predetermined current level), the method continues with the step 68 of providing current to the electrical load from supercapacitors 40 of backup power supply system 32. Step 68 may include several substeps. In substep 70, controller 44 determines whether supercapacitors 40 have a predetermined level of charge (e.g., are fully charged). If supercapacitors 40 do not have the predetermined level of charge, controller 44 may, in sub step 72, generate a warning signal indicating that the backup power supply system 32 is unable to provide sufficient power for use by braking system 10 so that the driver can take evasive actions (e.g., by slowly releasing fluid pressure from the brake actuator 18 or "bleeding" the brake 12). Controller 44 may again transmit the warning signal to interface 26 (directly or indirectly through brake controller 28) so that interface 26 generates an alert to the vehicle operator. After generating the warning signal, the method may return to substep 70 and repeat substeps 70, 72 until controller 44 determines that the supercapacitors 40 are sufficiently charged. Once the supercapacitors 40 have the predetermined level of charge, the method may proceed to substep 74 in which controller 44 generates an alert signal that supercapacitors 40 are sufficiently charged and that the vehicle operator can safely apply the brakes in the vehicle. Controller 44 may again transmit the alert signal to interface 26 (directly or indirectly through brake controller 28) so that interface 26 generates an alert to the vehicle operator. Further, in substep 76, controller 44 will provide current to brake controller 28 from supercapacitors 40.

Following step 68, the method may continue with step 78 in which controller 40 again determines whether an output of primary power supply 30 meets a predetermined condition (e.g., is within a predetermined acceptable operating range). Controller 44 may again make this determination responsive to sensors configured to generate signals indicative of various characteristics (voltage level, state of charge, etc.) of primary power supply 30. If the primary power supply does not meet the predetermined condition (e.g., is outside of the acceptable operating range), the controller 44 may return to step 58. If the primary power supply does meet the predetermined condition (e.g., is within the acceptable operating range), controller 44 may proceed to step 80 in which controller 44 determines whether the output of the primary power supply 30 has been stable for a predetermined period of time (e.g., thirty (30) milliseconds). If the output has not been stable over the predetermined time period, the controller may again return to step 58. If the output has been stable over the predetermined time period, the controller may return to step 52 (FIG. 2A).

Returning to step 66, if controller 44 determines the level of current required by brake controller 28 (or another electrical load) does not meet the predetermined condition (e.g., is less than a predetermined current level), controller 44 may, with reference to FIG. 2C, perform a step 82. In step 82, controller 44 provides current to brake controller 28 from battery 42 of backup power supply system 32 until an output of battery 42 meets a predetermined condition indicative of an insufficient charge in battery 42 and thereafter provides current to brake controller 28 from supercapacitors 40. Step 82 may again include several substeps. In substep 84, controller 44 provides power to brake controller 28 from battery 42. Controller 44 may also provide power to supercapacitors 40 from battery 42 to charge supercapacitors 40. In substep 86, controller 44 again determines whether the output of battery 42 meets a predetermined condition (e.g., is within a predetermined acceptable operating range). Controller 44 may make this determination responsive to sensors configured to generate signals indicative of various characteristics (voltage level, state of charge, etc.) of battery 42. If the output of battery 42 meets the predetermined condition (e.g., is within the acceptable operating range), the method returns to step 66 (FIG. 2B). If the output of battery 42 does not meet the predetermined condition (e.g., is outside of the acceptable range), the method proceeds to substep 88 in which controller 44 again generates a warning signal and, in particular, a signal that battery 42 is not within an acceptable operating range and many need replacement. In the illustrated embodiment, controller 44 may transmit the warning signal to interface 26 (directly or indirectly through brake controller 28) so that interface 26 generates an alert to the vehicle operator. Thereafter, in substep 90, controller 44 determines whether supercapacitors 40 have a predetermined level of charge (e.g., are fully charged). If the supercapacitors 40 have the predetermined level of charge, controller 44 returns to step 76 (FIG. 2B) in which power is provided to brake controller 28 from supercapacitors 40. If supercapacitors 40 do not have the predetermined level of charge, the method proceeds to substep 92 in which controller 44 generates a warning signal and, in particular, a signal that supercapacitors 40 do not have a sufficient charge and that the backup power supply system 32 is no longer available to assist with braking the vehicle in order to allow the vehicle operator to take evasive actions if braking is required (e.g., by slowly releasing fluid pressure from the brake actuator 18 or "bleeding" the brake 12). In the illustrated embodiment, controller 44 may transmit the warning signal to interface 26 (directly or indirectly through brake controller 28) so that interface 26 generates an alert to the vehicle operator.

A backup power supply system 32 for an electrical load such as brake controller 28 and a method for providing power to an electrical load in accordance with present teachings represents an improvement as compared to conventional backup power supply systems and methods for providing power. In particular, the system 32 and method control delivery of power from a supercapacitor 40 and a battery 42 to leverage advantageous properties, and minimize disadvantageous properties, of each type of power supply. In this manner, the system 32 and method are able to supply sufficient power for inrush currents for various electrical loads, insure a sufficient life span of the power supply system, and limit system size and cost.

While the invention has been shown and described with reference to one or more particular embodiments thereof, it will be understood by those of skill in the art that various changes and modifications can be made without departing from the spirit and scope of the invention.

What is claimed is:

1. A backup power supply system for an electrical load, comprising:
   at least one supercapacitor;
   a battery; and,
   a power supply controller configured to
      determine whether an output of a primary power supply for the electrical load meets a first predetermined condition;
      determine, when the output of the primary power supply does not meet the first predetermined condition, a level of current required by the electrical load;
      provide current to the electrical load from the at least one supercapacitor if the level of current required by the electrical load meets a second predetermined condition; and,
      provide current to the electrical load from the battery if the level of current required by the electrical load does not meet the second predetermined condition until an output of the battery meets a third predetermined condition and thereafter provide current to the electrical load from the at least one supercapacitor.

2. The backup power supply system of claim 1 wherein the power supply controller is further configured to provide power to the at least one supercapacitor from the primary power supply for the electrical load when the output of the primary power supply for the electrical load meets the first predetermined condition.

3. The backup power supply system of claim 1 wherein the power supply controller is further configured to:
   determine, prior to determining whether the output of the primary power supply for the electrical load meets the first predetermined condition, whether the output of the battery meets the third predetermined condition; and
   generate a warning signal if the output of the battery does not meet the third predetermined condition.

4. The backup power supply system of claim 1 wherein the power supply controller is further configured to determine, prior to determining the level of current required by the electrical load, whether a predetermined period of time has passed.

5. The backup power supply system of claim 1 wherein the power supply controller is further configured, in providing current to the electrical load from the at least one supercapacitor, to determine whether the at least one supercapacitor has a predetermined level of charge.

6. The backup power supply system of claim 1 wherein the power supply controller is further configured to:
   determine, after providing current to the electrical load from the at least one supercapacitor, whether the output of the primary power supply for the electrical load meets the first predetermined condition; and,
   repeat, when the output of the primary power supply for the electrical load does not meet the first predetermined condition, said step of determining a level of current required by the electrical load.

7. The backup power supply system of claim 1 wherein the power supply controller is further configured, in providing current to the electrical load from the battery, to also provide power to the at least one supercapacitor from the battery.

8. The backup power supply system of claim 1 wherein the power supply controller is further configured, in providing current to the electrical load from the battery, to generate, when the output of the battery meets the third predetermined condition, a warning signal indicating that that the battery meets the third predetermined condition.

9. The backup power supply system of claim 1 wherein the power supply controller is further configured, in providing current to the electrical load from the battery, to:
   determine, prior to thereafter providing current to the electrical load from the at least one supercapacitor, whether the at least one supercapacitor has a predetermined level of charge; and,
   generate, when the at least one supercapacitor does not have the predetermined level of charge, a warning signal indicating the backup power supply system cannot provide sufficient power to the electrical load.

10. A system for controlling a wheel brake in a vehicle, comprising:
- a solenoid valve configured to control a position of a brake actuator of the wheel brake;
- a brake controller configured to generate control signals for the solenoid valve; and,
- a backup power supply system for the brake controller including
  - at least one supercapacitor;
  - a battery; and,
  - a power supply controller configured to
    - determine whether an output of a primary power supply for the brake controller meets a first predetermined condition;
    - determine, when the output of the primary power supply does not meet the first predetermined condition, a level of current required by the brake controller;
    - provide current to the brake controller from the at least one supercapacitor if the level of current required by the brake controller meets a second predetermined condition; and,
    - provide current to the brake controller from the battery if the level of current required by the brake controller does not meet the second predetermined condition until an output of the battery meets a third predetermined condition and thereafter provide current to the brake controller from the at least one supercapacitor.

11. A method for providing power for an electrical load, comprising the steps of:
- determining whether an output of a primary power supply for the electrical load meets a first predetermined condition;
- determining, when the output of the primary power supply does not meet the first predetermined condition, a level of current required by the electrical load;
- providing current to the electrical load from at least one supercapacitor of a backup power supply system if the level of current required by the electrical load meets a second predetermined condition; and,
- providing current to the electrical load from a battery of the backup power supply system if the level of current required by the electrical load does not meet the second predetermined condition until an output of the battery meets a third predetermined condition and thereafter providing current to the electrical load from the at least one supercapacitor.

12. The method of claim 11, further comprising the step of providing power to the at least one supercapacitor from the primary power supply for the electrical load when the output of the primary power supply for the electrical load meets the first predetermined condition.

13. The method of claim 11, further comprising the steps of:
- determining, prior to determining whether the output of the primary power supply for the electrical load meets the first predetermined condition, whether the output of the battery meets the third predetermined condition; and
- generating a warning signal if the output of the battery does not meet the third predetermined condition.

14. The method of claim 11, further comprising the step of determining, prior to determining the level of current required by the electrical load, whether a predetermined period of time has passed.

15. The method of claim 11 wherein the step of providing current to the electrical load from the at least one supercapacitor includes the substep of determining whether the at least one supercapacitor has a predetermined level of charge.

16. The method of claim 11, further comprising the steps of:
- determining, after providing current to the electrical load from the at least one supercapacitor, whether the output of the primary power supply for the electrical load meets the first predetermined condition; and,
- repeating, when the output of the primary power supply for the electrical load does not meet the first predetermined condition, said step of determining a level of current required by the electrical load.

17. The method of claim 11 wherein the step of providing current to the electrical load from the battery includes also providing power to the at least one supercapacitor from the battery.

18. The method of claim 11 wherein the step of providing current to the electrical load from the battery includes the substep of generating, when the output of the battery meets the third predetermined condition, a warning signal indicating that that the battery meets the third predetermined condition.

19. The method of claim 11 wherein the step of providing current to the electrical load from the battery includes the steps of:
- determining, prior to thereafter providing current to the electrical load from the at least one supercapacitor, whether the at least one supercapacitor has a predetermined level of charge; and,
- generating, when the at least one supercapacitor does not have the predetermined level of charge, a warning signal indicating the backup power supply system cannot provide sufficient power to the electrical load.

20. The method of claim 11 wherein the electrical load comprises a brake controller and at least one solenoid valve used to control a position of a brake actuator, the controller configured to generate control signals for the at least one solenoid valve.

* * * * *